United States Patent
Cooper, Jr. et al.

(10) Patent No.: US 10,601,539 B2
(45) Date of Patent: Mar. 24, 2020

(54) MULTIPLE JAMMING SIGNAL TRANSMIT ANTENNAS WITH SPATIAL DIVERSITY

(71) Applicants: John S Cooper, Jr., Melbourne Beach, FL (US); James A Xanthos, Fulton, MD (US)

(72) Inventors: John S Cooper, Jr., Melbourne Beach, FL (US); James A Xanthos, Fulton, MD (US)

(73) Assignee: J3 TECHNOLOGY LLC, Indialantic, FL (US)

( * ) Notice: Subject to any disclaimer, the term of this patent is extended or adjusted under 35 U.S.C. 154(b) by 0 days.

(21) Appl. No.: 15/887,106

(22) Filed: Feb. 2, 2018

(65) Prior Publication Data

US 2019/0245645 A1    Aug. 8, 2019

(51) Int. Cl.

| | |
|---|---|
| H04B 7/04 | (2017.01) |
| H04W 48/02 | (2009.01) |
| H04K 3/00 | (2006.01) |
| H04B 7/06 | (2006.01) |
| H04B 1/715 | (2011.01) |
| H04B 1/04 | (2006.01) |
| H04B 1/10 | (2006.01) |
| H04B 1/12 | (2006.01) |
| H04B 1/69 | (2011.01) |

(52) U.S. Cl.
CPC ............. *H04K 3/43* (2013.01); *H04B 1/0483* (2013.01); *H04B 1/1081* (2013.01); *H04B 1/123* (2013.01); *H04B 1/715* (2013.01); *H04B 7/0613* (2013.01); *H04B 2001/6912* (2013.01); *H04K 2203/34* (2013.01)

(58) Field of Classification Search
CPC .... H04W 12/1204; H04W 4/021; H04K 3/00; H04K 3/40; H04K 3/42; H04K 3/43; H04K 3/44; H04K 3/45; H04K 2203/00
USPC .......................................................... 455/1
See application file for complete search history.

(56) References Cited

U.S. PATENT DOCUMENTS

| | | | |
|---|---|---|---|
| 4,468,792 A | * | 8/1984 | Baker ................... H04L 27/103 340/12.33 |
| 5,648,992 A | | 7/1997 | Wright et al. |
| 5,859,879 A | | 1/1999 | Bolgiano et al. |
| 6,005,516 A | | 12/1999 | Reudink et al. |
| 6,088,407 A | | 7/2000 | Buternowsky et al. |
| 6,335,953 B1 | | 1/2002 | Sanderford, Jr. et al. |

(Continued)

*Primary Examiner* — Philip Sobutka

(57) ABSTRACT

A jamming or MAS system is provided having multiple transmit antennas for transmitting respective transmit signals with spatial diversity to reduce multipath fading. The jamming or MAS communication system communicates with at least one receiver for receiving the transmit signals with no additional processing required at the receiver. In some embodiments, the jamming or MAS communication system includes an associated receiver for receiving and analyzing various signals.

The jamming or MAS communication system in the present invention is able to help reduce the effects of multipath fading without modifications to the receiver. Prior art attempts to reduce the effects of multipath fading require some form of additional processing at the receiver.

The invention is particularly useful when deployed in a Managed Access Service (MAS) system or a jamming system. In particular, such a system can be used in a facility (such as a prison, school, government building, etc) to prevent cellphone usage.

33 Claims, 5 Drawing Sheets

(56) References Cited

U.S. PATENT DOCUMENTS

| | | |
|---|---|---|
| 6,574,271 B2 | 6/2003 | Mesecher et al. |
| 6,842,444 B2 | 1/2005 | Bolgiano et al. |
| 6,983,008 B2 | 1/2006 | Mesecher |
| 7,813,413 B2 | 10/2010 | Mesecher |
| 9,270,327 B2 | 2/2016 | Mesecher et al. |
| 2015/0188662 A1* | 7/2015 | Shapira ................. H04K 3/825 455/1 |
| 2017/0163372 A1* | 6/2017 | Shibohta ................. H04K 3/00 |
| 2019/0173560 A1* | 6/2019 | Chapman ............... H04B 17/10 |

* cited by examiner

MULTIPLE JAMMING SIGNAL TRANSMIT ANTENNAS WITH SPATIAL DIVERSITY

CROSS-REFERENCES TO RELATED APPLICATIONS

This application claims priority to U.S. Non-Provisional application Ser. No. 15/614,138, filed Jun. 5, 2017, and entitled "SWITCHED TRANSMIT ANTENNAS WITH NO FEEDBACK FOR MULTIPATH REDUCTION," which is incorporated herein in its entirety for all purposes.

BACKGROUND OF THE INVENTION a) Field of the Invention

The invention relates to a jamming or MAS communication system having multiple transmit antennas with spatial diversity to reduce multipath fading.

b) Description of Related Art

In communication systems, transmitted RF signals tend to fade based on multipath interference. Multipath is caused when a transmitted RF signal takes more than one path to a receive antenna typically based on reflections, such as reflections off the ground or a wall. When the signals arrive at the receive antenna from the various paths, the composite signal, composed of the addition of the signals from different paths, can either undergo constructive or destructive interference. The result of this addition depends on the phase of the signals from the various paths relative to each other.

In an environment that uses a Distributed Antenna System (DAS) to distribute TX signals throughout a given area, the impact of multipath is particularly important. For example, if a DAS is used as part of a Managed Access Service (MAS) system in a facility (such as a prison, school, government building, etc) to prevent cellphone usage, then the effects of multipath become extreme because of the numerous walls. A MAS system is used in a facility to enable a series of local base stations (BTS) to capture all of the phones in the covered area in order to prevent the phones from connecting to the carrier macro network to place calls.

The prior art shows a variety of attempts, with a great deal of complexity and additional processing required at the receiver to reduce the effects of multipath fading.

U.S. Pat. No. 5,036,331 discloses a transmitter that transmits from multiple antennas with different polarizations, and a receiver with a receiver polarization combiner that combines signals that are received from receive antennas with different polarizations. This approach requires additional receiver processing to evaluate the received signals with each of the polarities.

U.S. Pat. No. 6,115,406 discloses a transmitter with multiple antennas that transmit with different CDMA spreading codes. The receiver receives the signals and separately deconvolves the various spreading codes and evaluates the best signal path.

U.S. Pat. No. 5,859,879 discloses a communication system with a transmitter that transmits the same data at three different times from three different antennas. The receiver then receives The data at each time interval and decodes and selects the best received data.

Previous attempts to mitigate the effects of multipath generally suffer from similar problems. Prior art attempts to reduce the effects of multipath fading require some form of additional processing at the receiver.

SUMMARY OF THE INVENTION

The object of the invention is to provide a jamming or MAS communication system having multiple transmit antennas with spatial diversity to reduce multipath fading.

The invention is particularly useful when deployed in a Managed Access Service (MAS) system or a jamming system. For example, such a system can be used in a facility (such as a prison, school, government building, etc) to prevent cellphone usage. Frequently, a Distributed Antenna System (DAS) may be used as part of a MAS system in a prison facility and the present invention can be used in conjunction with the DAS.

The jamming or MAS communication system in the present invention is able to help reduce the effects of multipath fading without modifications to the receiver. Prior art attempts to reduce the effects of multipath fading require some form of additional processing at the receiver.

The object is attained in a preferred embodiment of the invention having a jamming or MAS communication system comprising at least two transmitters coupled to respective antennas for transmitting the respective transmit signals with spatial diversity. The jamming or MAS communication system communicates with at least one receiver for receiving the transmit signals with no additional processing required at the receiver.

In a further embodiment of the invention, the jamming or MAS communication system comprises at least two transmitters coupled to respective antennas for transmitting the respective transmit signals with spatial diversity. The jamming or MAS communication system further includes at least one receiver coupled to a respective receive antenna. The jamming or MAS communication system communicates with at least one transceiver that receives the transmitted signals with no additional processing required at the receiver.

In another embodiment of the invention, the jamming or MAS communication system comprises at least two transmitters coupled to respective antennas for transmitting the respective transmit signals with spatial diversity. The jamming or MAS communication system communicates with at least one receiver for receiving the transmit signals with no additional processing required at the receiver. Additionally, an external transmit signal transmitted from an external transmitter to at least one of the receivers may exist. In this system, the signal strength of at least one of the transmit signals should dominate the signal strength of the external transmit signal when measured from at least one of the receivers.

In a further embodiment of the invention, the jamming or MAS communication system comprising at least two transmitters coupled to respective antennas for transmitting the respective transmit signals with spatial diversity. The jamming or MAS communication system further includes at least one receiver coupled to a respective receive antenna. The jamming or MAS communication system communicates with at least one transceiver that receives the transmitted signals (with no additional processing required at the receiver) and may transmit a secondary transmit signal. Additionally, an external transmit signal transmitted from an external transmitter to at least one of the transceivers may exist. In this system, the signal strength of at least one of the transmit signals should dominate the signal strength of the external transmit signal when measured from at least one of the transceivers.

In another embodiment of the invention, the jamming or MAS communication system comprises at least one transmitter coupled to respective antennas for transmitting the respective transmit signals with spatial diversity. The coupling of the at least one transmitter and one of the antennas is accomplished via an RF Element. The jamming or MAS communication system further includes at least one receiver coupled to a respective receive antenna. The jamming or MAS communication system communicates with at least one transceiver that receives the transmitted signals (with no additional processing required at the receiver) and may transmit a secondary transmit signal. Additionally, an external transmit signal transmitted from an external transmitter to at least one of the transceivers may exist. In this system, the signal strength of at least one of the transmit signals should dominate the signal strength of the external transmit signal when measured from at least one of the transceivers.

Advantageous embodiments of the invention, with useful features and improvements of the invention, are described in more detail below.

BRIEF DESCRIPTION OF THE DRAWINGS

The invention is described in detail below by way of preferred embodiments shown in the drawings.

DETAILED DESCRIPTION OF THE PREFERRED EMBODIMENTS

Referring to FIGS. 1-5, a jamming or MAS communication system having multiple transmit antennas with spatial diversity to reduce multipath fading will now be described with several preferred embodiments. It is understood that the embodiments described herein do not limit the scope of the invention, but merely provide examples of the present invention as used in several different instances.

Figure 1:
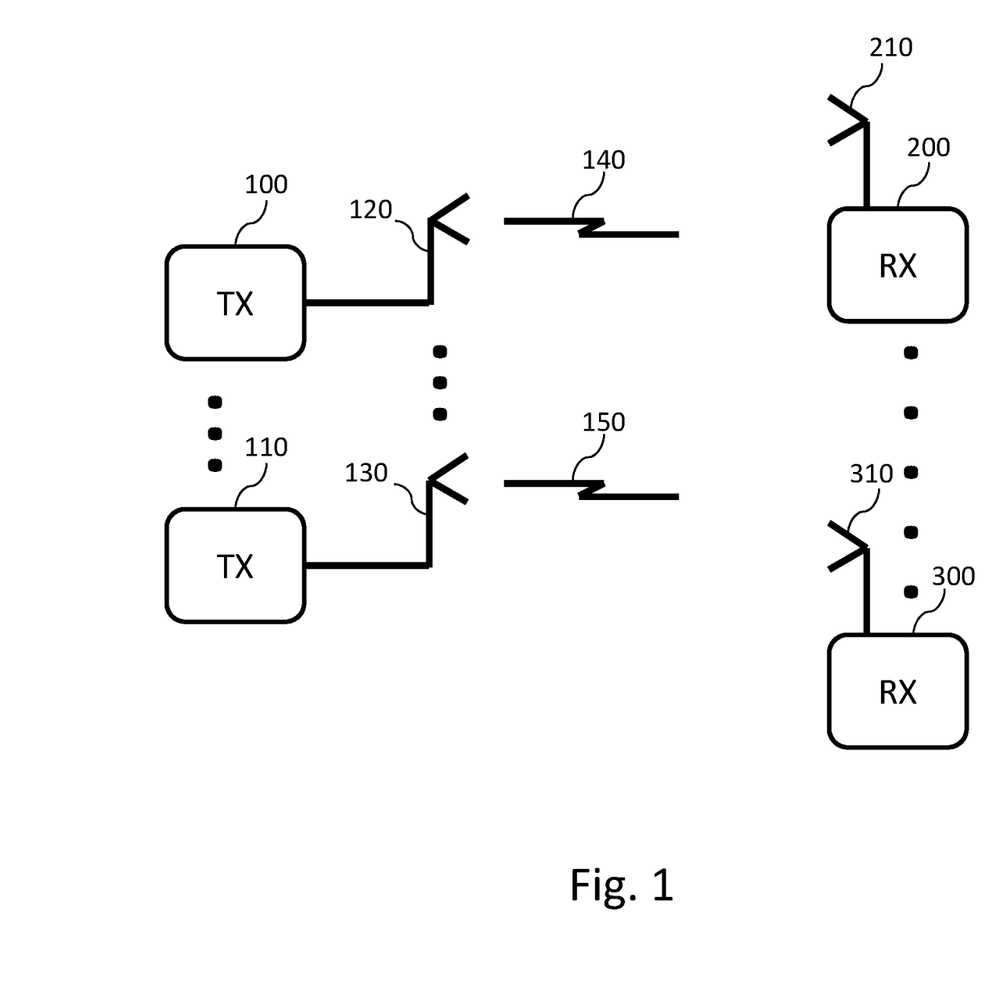
FIG. 1 is a drawing showing at least two transmitters coupled to respective antennas for transmitting the respective transmit signals with spatial diversity. The jamming or MAS communication system communicates with at least one receiver for receiving the transmit signals with no additional processing required at the receiver.

FIG. 1 shows a jamming or MAS communication system comprising at least two transmitters 100 & 110 coupled to at least two respective antennas 120 & 130 for transmitting the transmit signals 140 & 150 with spatial diversity. The transmit signals 140 & 150 are received by at least one receiver 200 & 300 through respective receive antennas 210 & 310.

The transmit signals 140 & 150 have spatial diversity in order to reduce the impact of multipath fading without the need for additional receiver complexity. Additional transmitters, respective antennas, and resultant transmit signals with spatial diversity may be added to the jamming or MAS communication system.

There are various possible relationships between transmit signals 140 & 150. In a jamming system using a chirped CW signal, the transmit signals 140 & 150 can have a fixed frequency offset, a variable (but deterministic) frequency offset, or be allowed to chirp independently so they are not aligned.

In a jamming system using random or pseudo-random noise, the transmit signals 140 & 150 can either be the same noise signals or different noise signals.

In another embodiment of the invention, the transmitters 100 & 110 are part of a MAS system and the respective transmit signals 140 & 150 are MAS signals.

Figure 2:
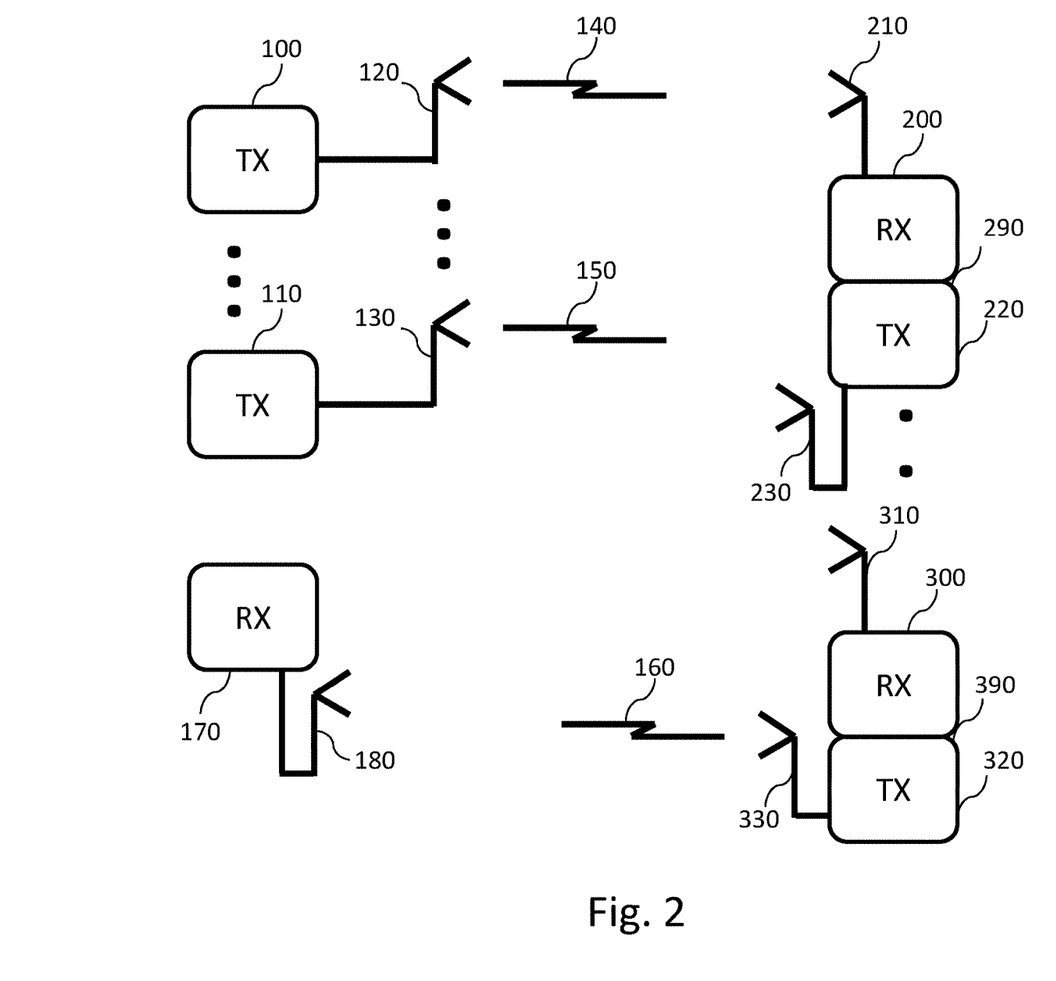
FIG. 2 is a drawing similar to FIG. 1 with the addition of at least one receiver on one end of the jamming or MAS communication link and at least one transceiver on the other end.

FIG. 2 shows a jamming or MAS communication system comprising at least two transmitters 100 & 110 coupled to at least two respective antennas 120 & 130 for transmitting the respective transmit signals 140 & 150 with spatial diversity. The jamming or MAS communication system further includes at least one receiver 170 coupled to a respective receive antenna 180. The jamming or MAS communication system communicates with at least one transceiver 290 & 390 that receives the transmitted signals 140 & 150. The transceivers 290 & 390 include respective secondary receivers 200 & 300 coupled to respective further antennas 210 & 310 to receive transmit signals 140 & 150. The transceivers 290 and 390 further include respective secondary transmitters 220 & 320 coupled to respective further antennas 230 & 330.

The transmit signals 140 & 150 have spatial diversity in order to reduce the impact of multipath fading without the need for additional receiver complexity. Additional transmitters, respective antennas, and resultant transmit signals with spatial diversity may be added to the jamming or MAS communication system.

The receiver 170 can be used to receive secondary transmit signal 160 which is transmitted from one of the at least one transmitters 220 & 320. The analysis of the received secondary transmit signal 160 can be used to determine if the transmitters 220 & 320 are actively transmitting, for example.

Additionally, receiver 170 can be used to receive at least one of transmit signals 140 & 150 which is transmitted from one of the at least one transmitters 100 & 110. The analysis of the received transmit signals 140 & 150 can be used to determine if the transmitters 140 & 150 are actively transmitting and at what effective power level and frequencies they are transmitting, for example.

Receiver 170 can be implemented in a variety of ways by those skilled in the art; for example, using a spectrum analyzer, scanner, etc.

There are various possible relationships between transmit signals 140 & 150. In a jamming system using a chirped CW signal, the transmit signals 140 & 150 can have a fixed frequency offset, a variable (but deterministic) frequency offset, or be allowed to chirp independently so they are not aligned.

In a jamming system using random or pseudo-random noise, the transmit signals 140 & 150 can either be the same noise signals or different noise signals.

Figure 3:
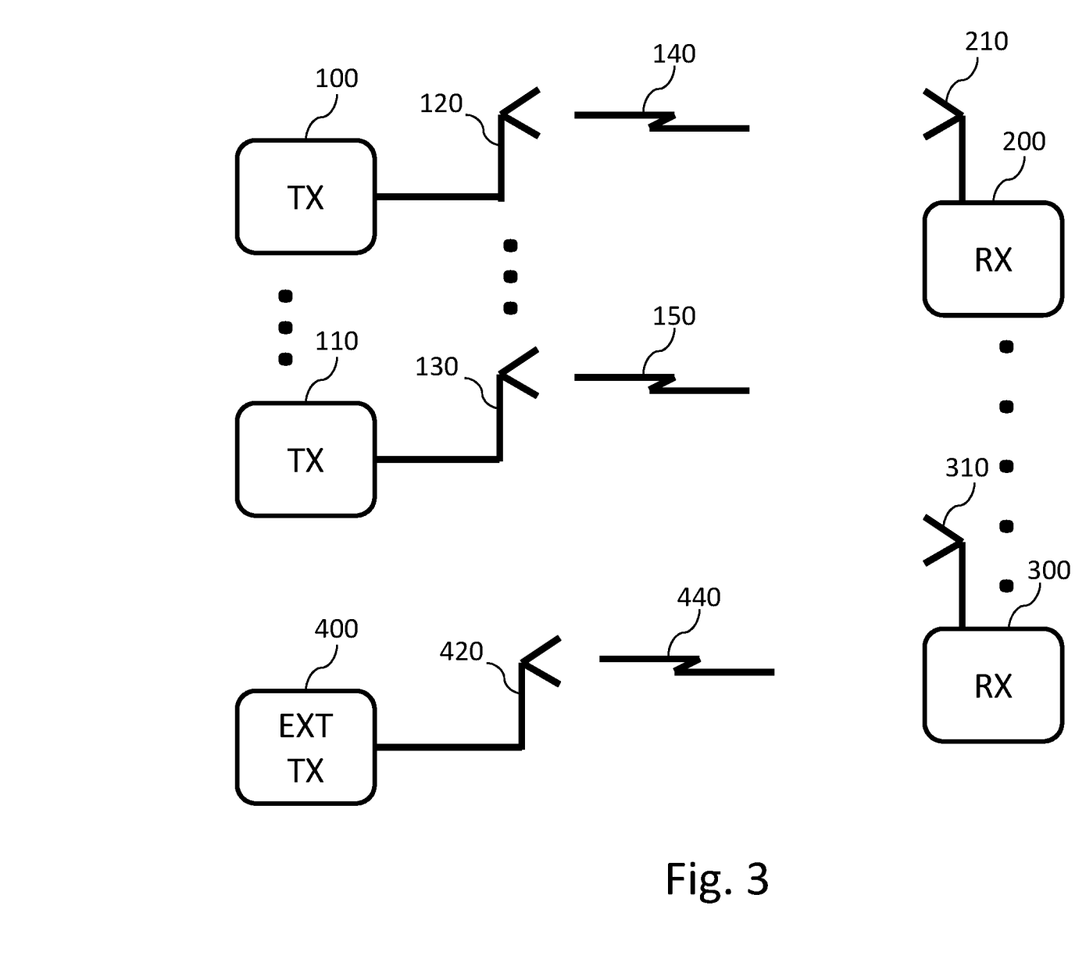
FIG. 3 is a drawing similar to FIG. 1 with the addition of an external transmitter.

FIG. 3 shows a jamming or MAS communication system comprising at least two transmitters 100 & 110 coupled to respective antennas 120 & 130 for transmitting the respective transmit signals 140 & 150 with spatial diversity. The jamming or MAS communication system communicates with at least one receiver 200 & 300 for receiving the transmit signals 140 & 150 via the respective antennas 210 and 310. Additionally, an external transmit signal 440 transmitted from an external transmitter 400 via the respective antenna 420 to the at least one receivers 200 and 300 via the respective antennas 210 & 310 may exist. In this system, the signal strength of transmit signals 140 & 150 may dominate the signal strength of the external transmit signal 440 when measured at the receivers 200 & 300.

The transmit signals 140 & 150 have spatial diversity in order to reduce the impact of multipath fading without the need for additional receiver complexity. Additional transmitters, respective antennas, and resultant transmit signals with spatial diversity may be added to the jamming or MAS communication system.

In one embodiment of the invention, the transmitters 100 & 110 are jammers and the respective transmit signals 140 & 150 are jamming signals that jam the external transmit signal 440 of external transmitter 400.

In another embodiment of the invention, the transmitters 100 & 110 are part of a MAS system and the respective transmit signals 140 & 150 are MAS signals that dominate the external transmit signal 440 of external transmitter 400.

There are various possible relationships between transmit signals 140 & 150. In a jamming system using a chirped CW signal, the transmit signals 140 & 150 can have a fixed frequency offset, a variable (but deterministic) frequency offset, or be allowed to chirp independently so they are not aligned. In a jamming system using random or pseudo-random noise, the transmit signals 140 & 150 can either be the same noise signals or different noise signals.

Figure 4:
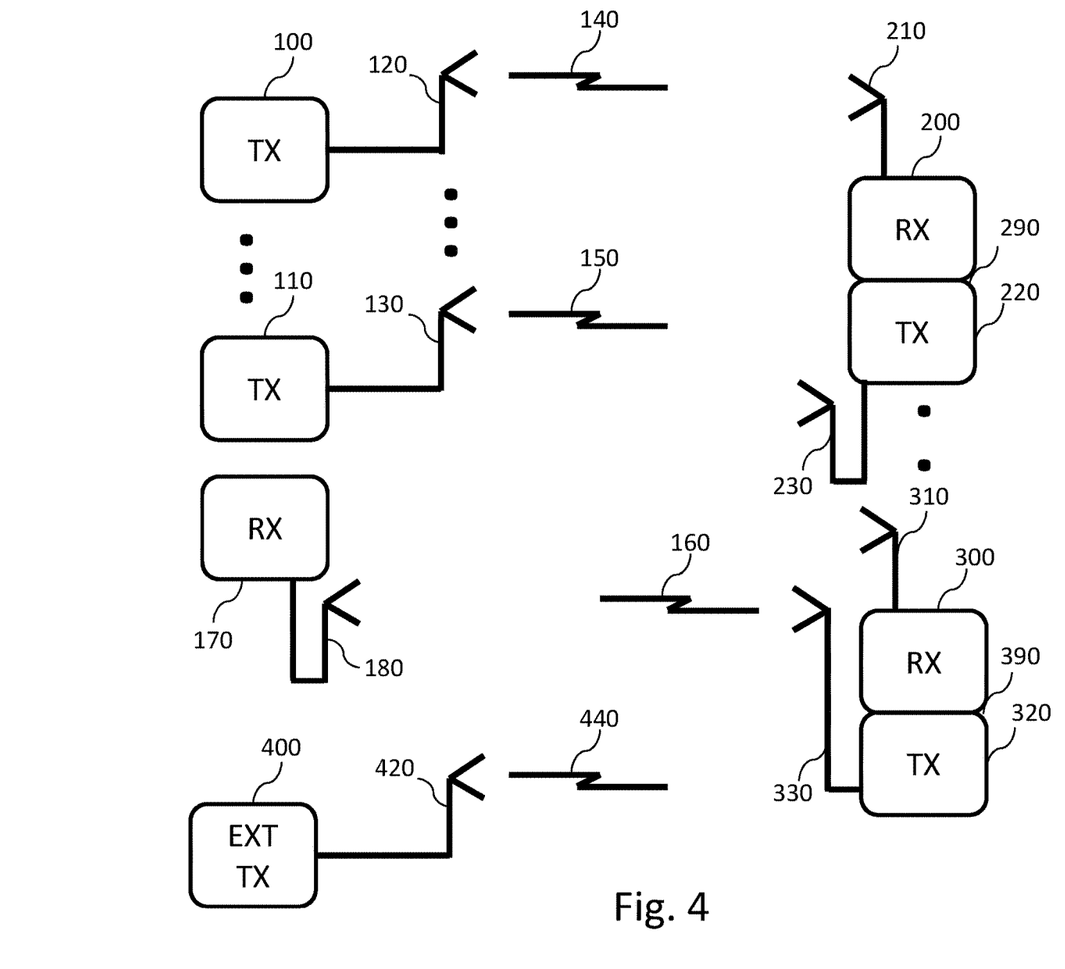
FIG. 4 is a drawing similar to FIG. 2 with the addition of an external transmitter.

FIG. 4 shows a jamming or MAS communication system comprising at least two transmitters 100 & 110 coupled to at least two respective antennas 120 & 130 for transmitting the respective transmit signals 140 & 150 with spatial diversity. The jamming or MAS communication system further includes at least one receiver 170 coupled to a respective receive antenna 180. The jamming or MAS communication system communicates with at least one transceiver 290 & 390 that receives the transmitted signals 140 & 150. The transceivers 290 & 390 including respective secondary receivers 200 & 300 coupled to respective further antennas 210 & 310 to receive transmit signals 140 & 150. The transceivers 290 & 390 further include respective secondary transmitters 220 & 320 coupled to respective further antennas 230 & 330.

Additionally, an external transmit signal 440 transmitted from an external transmitter 400 via the respective antenna 420 to the at least one receivers 200 and 300 via the respective antennas 210 & 310 may exist. In this system, the signal strength of transmit signals 140 & 150 may dominate the signal strength of the external transmit signal 440 when measured at the receivers 200 & 300.

The transmit signals 140 & 150 have spatial diversity in order to reduce the impact of multipath fading without the need for additional receiver complexity. Additional transmitters, respective antennas, and resultant transmit signals with spatial diversity may be added to the jamming or MAS communication system.

In one embodiment of the invention, the transmitters 100 & 110 are jammers and the respective transmit signals 140 & 150 are jamming signals that jam the external transmit signal 440 of external transmitter 400.

In another embodiment of the invention, the transmitters 100 & 110 are part of a MAS system and the respective transmit signals 140 & 150 are MAS signals that dominate the external transmit signal 440 of external transmitter 400.

The receiver 170 can be used to receive secondary transmit signal 160 which is transmitted from one of the at least one transmitters 220 & 320. The analysis of the received secondary transmit signal 160 can be used to determine if the transmitters 220 & 320 are actively transmitting and at what effective power level and frequencies they are transmitting, for example.

Additionally, receiver 170 can be used to receive at least one of transmit signals 140 & 150 which is transmitted from one of the at least one transmitters 100 & 110. The analysis of the received transmit signals 140 & 150 can be used to determine if the transmitters 140 & 150 are actively transmitting and at what effective power levels and frequencies they are transmitting, for example.

Also, receiver 170 can be used to receive external transmit signal 440 which is transmitted from external transmitter 400. The analysis of external transmit signal 440 can be used to determine the relative power levels and frequencies of the signals contained in that signal.

Receiver 170 can be implemented in a variety of ways by those skilled in the art; for example, using a spectrum analyzer, scanner, etc.

There are various possible relationships between transmit signals 140 & 150. In a jamming system using a chirped CW signal, the transmit signals 140 & 150 can have a fixed frequency offset, a variable (but deterministic) frequency offset, or be allowed to chirp independently so they are not aligned.

In a jamming system using random or pseudo-random noise, the transmit signals 140 & 150 can either be the same noise signals or different noise signals.

Figure 5:
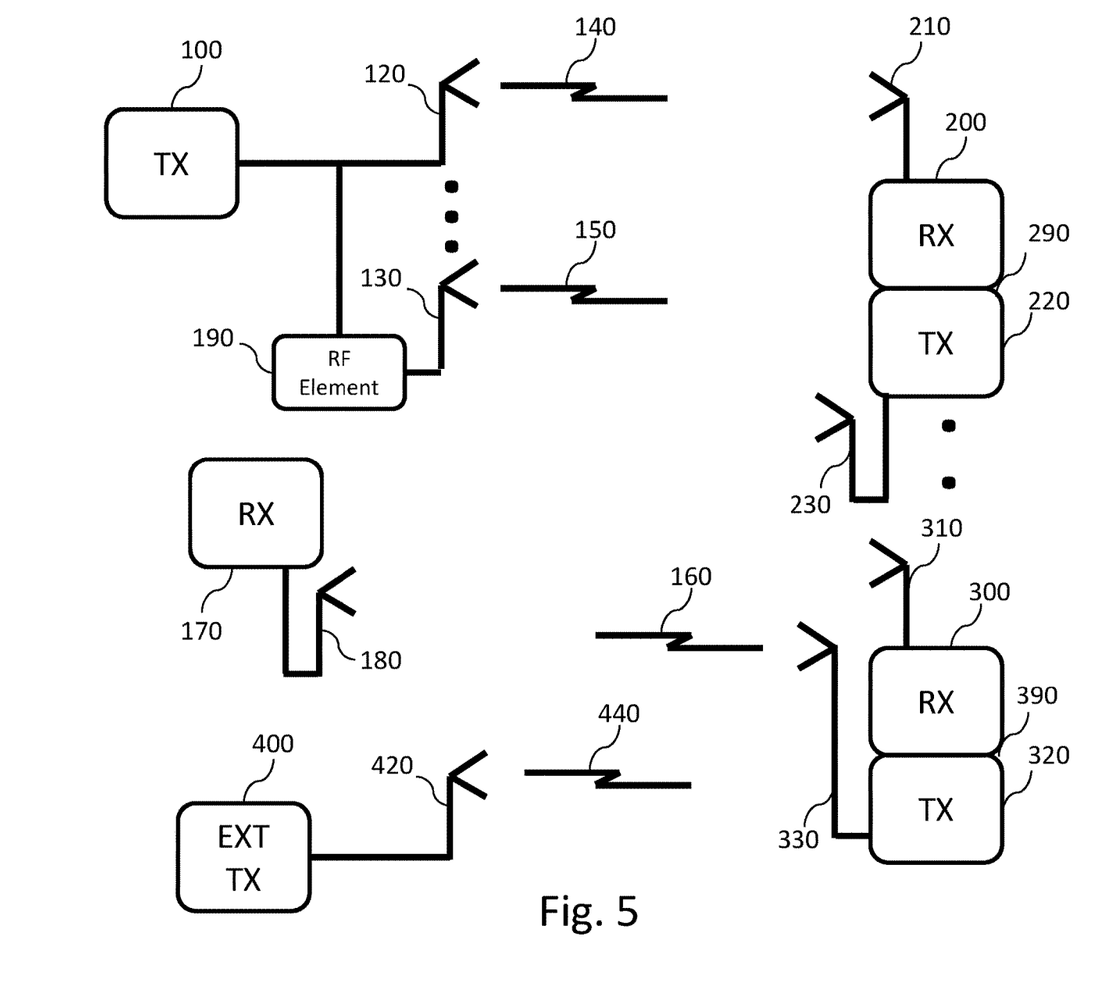
FIG. 5 is a drawing similar to FIG. 4 with the addition of an RF element in lieu of one of the transmitters.

FIG. 5 shows a jamming or MAS communication system comprising at least one transmitter 100 coupled to at least two respective antennas 120 & 130 for transmitting the respective transmit signals 140 & 150 with spatial diversity. The coupling of at least one transmitter 100 and antenna 130 is accomplished via RF Element 190 which can be, for example, a frequency shifter or a time shifter.

The jamming or MAS communication system further includes at least one receiver 170 coupled to a respective receive antenna 180. The jamming or MAS communication system communicates with at least one transceiver 290 & 390 that receives the transmitted signals 140 & 150. The transceivers 290 & 390 including respective secondary receivers 200 & 300 coupled to respective further antennas 210 & 310 to receive transmit signals 140 & 150. The transceivers 290 & 390 further include respective secondary transmitters 220 & 320 coupled to respective further antennas 230 & 330.

Additionally, an external transmit signal 440 transmitted from an external transmitter 400 via the respective antenna 420 to at least one of the receivers 200 and 300 via the respective antennas 210 & 310 may exist. In this system, the signal strength of transmit signals 140 & 150 may dominate the signal strength of the external transmit signal 440 when measured at the receivers 200 & 300.

The transmit signals 140 & 150 have spatial diversity in order to reduce the impact of multipath fading without the need for additional receiver complexity. Additional transmitters, respective antennas, and resultant transmit signals with spatial diversity may be added to the jamming or MAS communication system.

In one embodiment of the invention, the transmitter 100 is a jammer and the respective transmit signals 140 & 150 are jamming signals that jam the external transmit signal 440 of external transmitter 400.

In another embodiment of the invention, the transmitter 100 is part of a MAS system and the respective transmit signals 140 & 150 are MAS signals that dominate the external transmit signal 440 of external transmitter 400.

The receiver 170 can be used to receive secondary transmit signal 160 which is transmitted from one of the at least one transmitters 220 & 320. The analysis of the received secondary transmit signal 160 can be used to determine if the transmitters 220 & 320 are actively transmitting and at what effective power level and frequencies they are transmitting, for example.

Additionally, receiver 170 can be used to receive at least one of transmit signals 140 & 150 which are transmitted from transmitter 100. The analysis of the received transmit signals 140 & 150 can be used to determine if the transmitters 140 & 150 are actively transmitting and at what effective power level and frequencies they are transmitting, for example.

Also, receiver 170 can be used to receive external transmit signal 440 which is transmitted from external transmitter 400. The analysis of external transmit signal 440 can be used to determine the relative power levels and frequencies of the signals contained in that signal.

Receiver 170 can be implemented in a variety of ways by those skilled in the art; for example, using a spectrum analyzer, scanner, etc.

There are various possible relationships between transmit signals 140 & 150. In a jamming system using a chirped CW signal, the transmit signals 140 & 150 can have a fixed frequency offset, a variable (but deterministic) frequency offset, or be allowed to chirp independently so they are not aligned.

In a jamming system using random or pseudo-random noise, the transmit signals 140 & 150 can either be the same noise signals or different noise signals.

The various relationships between transmit signals 140 & 150 are accomplished via RF Element 190 which can be, for example, a frequency shifter or a time shifter.

The invention is particularly useful when deployed in a Managed Access Service (MAS) system or a jamming system. Such a system can be used in a prison environment in order to disable contraband cellphones. Frequently, a Distributed Antenna System (DAS) may be used as part of a MAS system in a prison facility and the present invention can be used in conjunction with the DAS.

While the present invention has been shown and described with reference to a number of preferred embodiments, it is well known to those of skill in the art that the invention may be practiced otherwise than as specifically disclosed and claimed herein.

For example, although some of the TX and RX antennas are shown as separate antennas, it is well known by those of the ordinary skill in the art that the same effect can be accomplished with a single antenna for TX and RX that uses a diplexer to separate signals.

What is claimed is:

1. A jamming system for reducing multipath fading comprising:
    at least two transmitters;
    at least two transmit antennas with spatial diversity, coupled respectively to the transmitters, for transmitting respective transmit signals having different frequencies;
    wherein the transmit signals are received by at least one receiver, through a receive antenna.

2. The jamming system according to claim 1, wherein the transmit signals are jamming signals.

3. The jamming system according to claim 2, wherein the transmit signals are chirped CW signals.

4. The jamming system according to claim 3, wherein the chirped CW signals have a fixed frequency offset.

5. The jamming system according to claim 3, wherein the chirped CW signals have a variable frequency offset.

6. The jamming system according to claim 3, wherein the chirped CW signals chirp independently.

7. The jamming system according to claim 2, wherein the transmit signals are noise signals.

8. A jamming system for reducing multipath fading comprising:
    at least two primary transmitters; and
    at least two primary transmit antennas with spatial diversity, coupled respectively to the primary transmitters, for transmitting respective primary transmit signals having different frequencies;
    wherein the primary transmit signals are received by at least one secondary receiver, through a secondary receive antenna.

9. The jamming system according to claim 8, further comprising:
    at least one primary receiver, for receiving a primary receive signal.

10. The jamming system according to claim 9, wherein the primary receiver receives and analyzes at least one of the primary transmit signals.

11. The jamming system according to claim 9, wherein the primary receiver receives and analyzes a secondary transmit signal from a secondary transmitter, associated with the secondary receiver.

12. The jamming system according to claim 8, wherein the primary transmit signals are jamming signals.

13. The jamming system according to claim 12, wherein the primary transmit signals are chirped CW signals.

14. The jamming system according to claim 13, wherein the chirped CW signals have a fixed frequency offset.

15. The jamming system according to claim 13, wherein the chirped CW signals have a variable frequency offset.

16. The jamming system according to claim 13, wherein the chirped CW signals chirp independently.

17. The jamming system according to claim 12, wherein the primary transmit signals are noise signals.

18. The jamming system according to claim 8, wherein an external transmit signal is transmitted by an external transmitter.

19. The jamming system according to claim 18, wherein at least one of the primary transmit signals dominates the external transmit signal.

20. The jamming system according to claim 18, further comprising:
    A primary receiver that receives and analyzes the external transmit signal.

21. A jamming system for reducing multipath fading comprising:
    at least one primary transmitter;
    at least one RF Element, coupled to the at least one primary transmitter; and
    at least two primary transmit antennas with spatial diversity, one coupled to the at least one primary transmitter and the other coupled via the RF Element to the at least one primary transmitter, for transmitting respective primary transmit signals having different frequencies;
    wherein the primary transmit signals are received by at least one secondary receiver, through a secondary receive antenna.

22. The jamming system according to claim 21, further comprising:
   at least one primary receiver, for receiving a primary receive signal.

23. The jamming system according to claim 22, wherein the primary receiver receives and analyzes at least one of the primary transmit signals.

24. The jamming system according to claim 22, wherein the primary receiver receives and analyzes a secondary transmit signal from a secondary transmitter, associated with the secondary receiver.

25. The jamming system according to claim 21, wherein the primary transmit signals are jamming signals.

26. The jamming system according to claim 25, wherein the primary transmit signals are chirped CW signals.

27. The jamming system according to claim 26, wherein the chirped CW signals have a fixed frequency offset.

28. The jamming system according to claim 26, wherein the chirped CW signals have a variable frequency offset.

29. The jamming system according to claim 26, wherein the chirped CW signals chirp independently.

30. The jamming system according to claim 25, wherein the primary transmit signals are noise signals.

31. The jamming system according to claim 21, wherein an external transmit signal is transmitted by an external transmitter.

32. The jamming system according to claim 31, wherein at least one of the primary transmit signals dominates the external transmit signal.

33. The jamming system according to claim 31, wherein the primary receiver receives and analyzes the external transmit signal.

* * * * *